March 22, 1955  G. VAN GELDER ET AL  2,704,589
AUTOMATIC OVERLOAD RELEASE CLUTCH MECHANISM
Filed Dec. 22, 1950  2 Sheets-Sheet 1
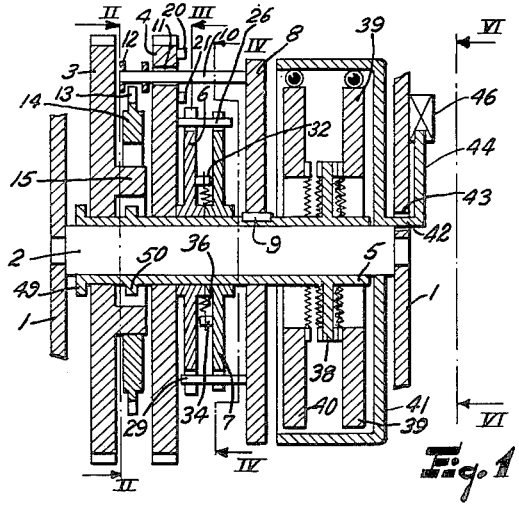
INVENTORS
GOZEWIJN VAN GELDER
WILHELMUS L. VERVEST
SJOERD THEUNIS STAP
BY
AGENT

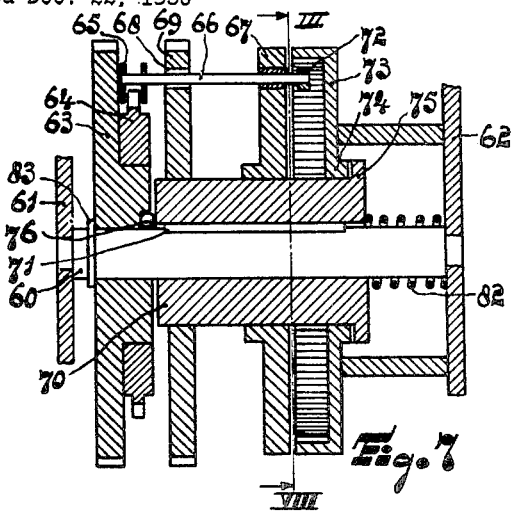
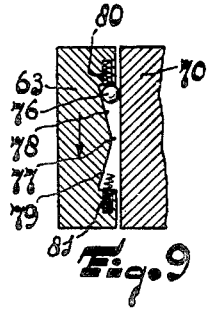
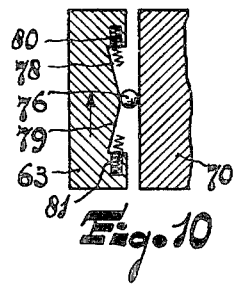
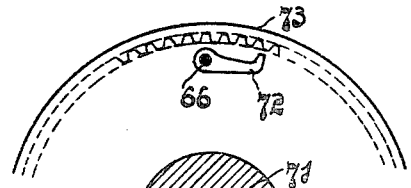
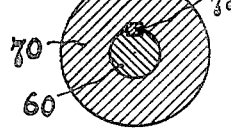
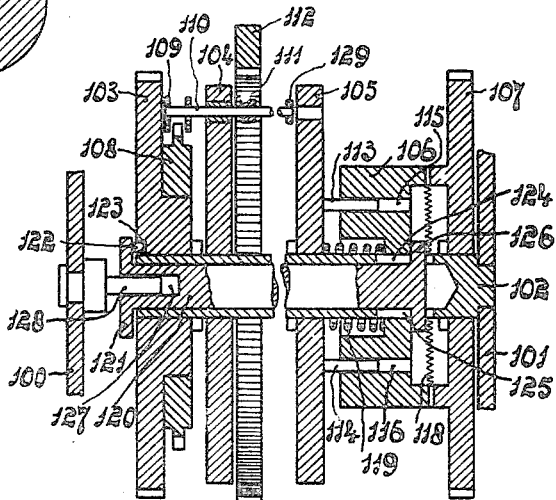

United States Patent Office 2,704,589
Patented Mar. 22, 1955

2,704,589

AUTOMATIC OVERLOAD RELEASE CLUTCH MECHANISM

Gozewijn Van Gelder, Hilversum, and Wilhelmus Lambertus Vervest and Sjoerd Theunis Stap, Eindhoven, Netherlands, assignors to Hartford National Bank and Trust Company, Hartford, Conn., as trustee Application December 22, 1950, Serial No. 202,302

Claims priority, application Netherlands January 14, 1950

20 Claims. (Cl. 192—56)

This invention relates to automatic overload release clutch mechanisms comprising two relatively displaceable parts, of which the first, hereinafter referred to as part A, upon overload of the output part of the mechanism, is displaced against a directional force with respect to the second of said parts, hereinafter referred to as part B, by means of the motive power provided by the input part, said displacement interrupting the connection of the input part with the output part and the part A, which connection is re-established when the relative displacement of the two parts is neutralised, and means being provided which during overload prevent a decrease of the relative displacements of the parts A and B which have brought about the interruption of the coupling between the input and output parts.

In known clutch mechanisms of this type, the connection between the input and output parts is completely interrupted by overload of the output part, it being utterly impossible for the input part to affect the output part during overload.

However, it is frequently desirable that upon reversal of the direction of movement of the input part, the output part should be taken along in the new direction of movement, regardless of the fact that the output part was overloaded in the previously followed direction of movement and for this purpose, the known type of clutch mechanism is inoperative.

The object of the present invention is to provide a construction of clutch mechanism of the type mentioned in the preamble, in which the desirable feature expressed in the foregoing is realised in a simple manner.

According to the invention, the mechanism comprises a member, hereinafter referred to as the reversing member, which is coupled to the input part and which, upon reversal of the direction of movement of the input part, undergoes a displacement by which, when the clutch mechanism is disengaged, the relative movability of the parts A and B is restored, so that said parts reassume the relative positions they occupied prior to overload by the action of the directional force and hence the connection between the input and output parts of the clutch mechanism is re-established.

In the clutch mechanism according to the invention, upon reversal of the direction of movement of the input part, the output part is invariably taken along, either directly in that the connection between input and output parts transferring the motive power was already provided at the beginning of the reversal, or indirectly in that this connection, if it was previously interrupted due to overload, is first re-established by the displacement of the reversing member.

In one advantageous form of construction of the clutch mechanism according to the invention, this mechanism is operative as an overload coupling also for the new direction of movement. For this purpose the two relatively displaceable parts A and B are so constructed that, upon overload of the output part, with opposite directions of movement of said parts, they are displaced from their initial relative position (central position) in opposite directions with respect to one another, the directional force invariably being operative in such manner as to drive the two parts invariably towards their central position. Furthermore, due to relative displacement of the parts A and B in one direction or in the other opposite direction, the coupling between the input and output parts of the clutch mechanism is interrupted, to be restored when the two parts return to their relative initial position.

In one preferred form of clutch mechanism according to the invention, similarly as in a known clutch mechanism of the type mentioned in the preamble, part A is constituted by an auxiliary member transferring the motive power and connected by way of a disengageable coupling to the input part, and part B is constituted by the output part of the clutch mechanism. Neutralisation of the relative displacement of the auxiliary member and the output part following overload is prevented by means coupling the auxiliary member during overload to a fixed part of the mechanism. In this clutch mechanism, the reversing member co-operates with the said means in such manner that by displacement of the reversing member due to reversal of the direction of movement of the input part, any connection between the auxiliary member and the fixed part by way of the said means is interrupted. Consequently, if the clutch mechanism should be disengaged due to overload in the preceding direction of movement, the auxiliary member is released. The latter will then move by the action of the directional force with respect to the output part and this movement results in the inoperative coupling between the input part and the auxiliary member being re-engaged.

In a further preferred form of clutch mechanism according to the invention, in which part A is likewise constituted by an auxiliary member which transfers the motive power and which is coupled to a fixed part of the mechanism upon overload, part B is constituted by an element included in the connection, transferring the motive power, between the auxiliary member and the output part. This element is subject to the directional force either directly or by way of the auxiliary member, which directional force drives the two parts to their central position. Provided between this element and the output part is a disengageable coupling which is disengaged by the displacement of the reversing member occurring upon reversal of the input part, to be subsequently engaged again. Consequently, if prior to the reversal of the direction of movement of the input part, the clutch mechanism is disengaged due to overload of the output part, the interruption of the connection between part B and the output part results in part B being released. Part B then moves by the action of the directional force with respect to the auxiliary member coupled to the fixed part, the relative displacement of the parts A and B, which has caused the connection between the input part and the auxiliary member to be switched off, thus being neutralised and this connection being re-established. It is necessary in this case that the coupling between the auxiliary member and the fixed part is also dependent upon the relative displacement of the parts A and B, so that this coupling is inoperative in the initial relative position of said parts. After the connection between the input part and the auxiliary member is re-established, this coupling must not prevent the auxiliary member from being taken along in the new direction of movement.

In some constructions of the two last-mentioned preferred forms of clutch mechanism according to the invention, it may occur that upon movement of the input part in one direction, the means which, upon interruption of the connection between the input part and the auxiliary member following overload in this direction, must prevent the auxiliary member from reversing its movement by coupling it with the fixed part, occupy the operative position even before there is question of interruption of the said connection. Such is the case, for example, when these automatically operating means comprise free-wheel couplings, for example clamping roller couplings or ratchet and ratchet-wheel couplings which are operative in one direction only. If in this case the direction of movement of the input part would be reversed, the motive power exerted upon the auxiliary member is reversed, but this member cannot be taken along in the new direction of movement due to the blocking by the said coupling means, so that damage might occur. To avoid this, in an advantageous embodiment of the clutch mechanism according to the invention, a certain lost-motion is provided in the interruptable connection between the input part and the auxiliary member.

This lost-motion ensures that upon reversal of the direction of movement of the input part, the auxiliary member is not taken along immediately in the new direction of movement. The reversing member, owing to its displacement occurring upon reversal, is first enabled to disengage the operative blocking means or to remove them from the connection between the auxiliary member and the fixed part, before the motive power is transferred in the new direction of movement onto the auxiliary member.

The displacement of the reversing member occurring upon reversal is preferably effected transversely to the direction of movement of the input part. In one advantageous embodiment of the clutch mechanism according to the invention, this displacement is ensured by means of one or more roller bodies co-operating with running surfaces of the input part and the reversing member. Of the two elements, input part and reversing member, one may be provided with one or more running surfaces extending in the direction of movement of the input part, and the other may be provided with one or more running surfaces which occupy inclined positions with respect to the first-mentioned running surfaces. The construction may be such that, upon reversal of the direction of movement of the input part, the reversing member is displaced in one direction and moved back upon renewed reversal of the direction of movement.

In embodiments of the clutch mechanism according to the invention in which the reversing member, due to its movement, interrupts a connection which must be re-established for the further operation of the mechanism, it is advantageous to cause the reversing member to perform a reciprocating stroke upon reversal of the direction of movement of the input part. This may be realised, for example, by providing either the reversing member or the input part with two running surfaces adjoining in the direction of movement of the input part and by causing a roller body to co-operate with these running surfaces, which roller body also co-operates with a running surface of the other of the said members, which latter surface extends in the direction of movement of the input part. By providing that the two adjoining running surfaces, from their transition, decline with respect to the running surface on the other member, it is ensured that, upon reversal of the direction of movement of the input part, the roller body is moved over one running surface to the adjoining declined running surface, thereby pushing away the reversing member, to allow the reversing member by the action of a spring force to return to its initial position after the roller body has passed the transition between the two inclined running surfaces.

The reversing member is preferably caused to act upon a claw coupling and one half thereof to disengage from the other half due to the displacement of the reversing member. In this case the reversing member itself may constitute the displaceable half of the claw coupling. According to the invention, said claw coupling, controlled by the reversing member, may be included in the connection between the auxiliary member and the fixed part and this in series with a coupling which becomes operative upon overload and which thus couples the auxiliary member by way of the claw coupling to the fixed part.

Similarly as in known clutch mechanisms of the type described in the preamble, the clutch mechanism according to the invention may also be provided with a master or control member for one or more devices to be controlled as a function of the position of the clutch mechanism.

For this purpose the master or control member may be constituted by an element which is included in the connection between the auxiliary member and the fixed part and which is displaceable with respect to the fixed part in the direction of movement of the auxiliary member through a limited stroke only. Preferably, use is made of means holding the master member by means of a directional force in a central position with respect to the fixed part so that the master member is displaced to one or to the other side, according to the direction of movement of the input part upon coupling of the auxiliary member and the fixed part following overload. In one advantageous embodiment of a clutch mechanism according to the invention which is provided with a master member, one or more electric contact devices co-operate with the master member, which devices are switched by the master member upon overload of the clutch mechanism.

An important use of clutch mechanisms according to the invention is found in machine tools adapted for cutting internal screw thread, drilling or milling. It is known that breakage of the tool due to a sudden material increase in load during one of the said operations is an inconvenience which frequently occurs. This may be avoided by providing a clutch mechanism according to the invention in the connection between the driving mechanism for the cutting movement and the tool. This not only affords the advantage that, upon overload of the tool, the connection between the driving mechanism and the tool is interrupted and further driving of the tool does not take place, but also that, due to reversal of the movement of the driving mechanism, its connection with the tool is re-established and thus the jammed tool may be loosened from the work-piece to be treated. As a rule, in the said machine tools, the tool is placed in a loose holder, which is positioned in the machine tool. A clutch mechanism according to the invention lends itself more particularly to be incorporated in such a loose holder.

In order that the invention may readily be carried into effect, three examples will now be described in detail with reference to the accompanying drawings, of which:

Fig. 1 shows a longitudinal section of one form of clutch mechanism in which the reversing member may be connected alternately to two free-wheels which are operative in opposite directions of movement;

Fig. 2 shows some details of a cross-sectional view, taken on the line II—II in Fig. 1;

Figs. 3a to 3c inclusive show a detail of the cross-sectional view taken on the line III—III in Fig. 1, in different positions;

Fig. 4 is a cross-sectional view taken on the line IV—IV in Fig. 1;

Fig. 5 elucidates the manner in which the reversing member of the clutch mechanism in Fig. 1 is displaced;

Fig. 6 is a right-hand view of a part of the clutch mechanism in Fig. 1;

Fig. 7 shows a longitudinal section of one form of clutch mechanism in which the reversing member forms part of a claw coupling between a fixed part of the mechanism and a separate member which is coupled to the auxiliary member upon overload of the output part;

Fig. 8 shows diagrammatically a cross-section taken on the line VIII—VIII of the clutch mechanism in Fig. 7;

Figs. 9 and 10 elucidate the co-operation between the input part and the reversing member of the clutch mechanism shown in Fig. 7 and Fig. 11 is a longitudinal sectional view of one form of clutch mechanism in which the auxiliary member is resiliently connected to a separate member connected to the output part by way of a disengageable claw coupling which may be interrupted by the reversing member.

Of the clutch mechanism shown in Fig. 1, nearly all parts are carried by a shaft 2 supported in frame plates 1. The input part and the output part of the clutch mechanism are constituted by gear wheels 3 and 4 respectively. Both wheels are freely rotatable about a sleeve-like reversing member 5, which is rotatable about shaft 2. Intermediate discs 6 and 7 are provided and are freely rotatable on the reversing member 5. The latter furthermore carries a disc-shaped auxiliary member 8 which, due to a key 9, cannot turn with respect to the reversing member but which is adapted to slide. The auxiliary member 8 carries a pawl shaft 10 which extends through a slot 11 of particular shape provided in the output wheel 4, and which carries at its end a rotatable pawl 12. This pawl is adapted to co-operate with square teeth 13 of an intermediate member 14, which is carried by a ring 15 of the input part 3. The ring 15 has a cam 16, which extends into a recess 17 of the intermediate member 14. A lost-motion is intentionally provided between the parts 3 and 14 owing to the length of the recess 17 exceeding the width of the cam 16.

The pawl 12 is constituted by two parallel pawl walls connected by the pawl shaft 10 and a pin 18 which is adapted to co-operate with the square teeth 13. The pin 18 is lengthened towards the side of the output wheel 4 and extends through the aforementioned slot 11 of this wheel. On the other side of the wheel 4, the pin 18 extends through a V-shaped recess of a plate 19, which engages the side of the wheel 4 and which is kept in position by two resilient strips 20 and 21 secured to the wheel 4 at 22 and 23. Pins 24 and 25 on the wheel 4, which serve as stops, co-operate with the springs 20 and 21.

The output part 4 is provided with a pin 26, which extends through recesses 27 and 28 of the two intermediate discs 6 and 7. The auxiliary member has a pin 29 which extends into the discs 6 and 7 through recesses 30 and 31 provided in diametric opposition to the recesses 27 and 28 (see Figs. 1 and 4). Each of the adjacent sides of the discs 6 and 7 has two diametrically positioned pins indicated by 32 and 33 for the disc 6 and by 34 and 35 for the disc 7. The pins 33 and 35 and the pins 32 and 34 are interconnected by springs 36 and 37 respectively, which springs exert a turning moment upon the two discs, so that in the normal operating position of the clutch mechanism as shown in Fig. 4, the said discs engage the pin 29 on the auxiliary member with the edges of the recesses 30 and 31.

The reversing member 5 is provided with a flange 38, each side of which carries a toothed rim. The toothed rims are adapted to co-operate alternately with a corresponding toothed rim of either of the parts 39 and 40, each of which is connected to a hollow cylindrical part 41 by way of a free-wheel coupling. Clamping balls are provided between the outer edges of the parts 39 and 40, which are provided with recesses having inclined bottoms, and the inner wall of the part 41. The recesses in the parts 39 and 40 are so positioned that the part 39, upon rotation in the left-hand sense, is blocked with respect to the part 41, whilst the part 40 cannot turn with respect to the wheel 41 in the right-hand sense. The part 41 is rotatable about the shaft 2 and has an extension 42, which extends through an aperture 43 of the right-hand frame plate 1. The aperture 43, in the sense of rotation about the shaft 2, is slightly wider than the extension 42, so that the part 41 is rotatable through a small stroke. Secured to the extension 42 is an arm 44, which is adapted to co-operate with two micro-switches 45 and 46 secured to the right-hand frame plate 1. The part 41 is held in a central position by means of two springs 47 and 48 which engage the arm 44 and each of the other extremities of which is secured to the frame plate 1, the extension 42 being clear of the edge of the aperture 43. The part 41 is adapted to be moved from this central position either in one or in the other sense of rotation, switch 45 or switch 46 being actuated according to the sense of rotation.

The input part 3 is supported by the reversing member 5 between two upright edges 49 and 50 thereof. The adjacent lateral surfaces of these edges are spaced apart a distance exceeding the width of the input wheel 3. The latter is provided, at the heighth of the upright edges 49 and 50, with two recesses 51 and 52, which have inclined bottoms with respect to the said edges. The recesses 51 and 52 accommodate balls 53 and 54, which are forced by means of springs 55 and 56 towards the narrow portions of the recesses. This may be seen from Fig. 5, which shows a development of the cyclindrical contact surface between the input wheel 3 and the reversing member 5. Upon movement of the input wheel 3 in the right-hand sense, viewed from the left in Fig. 1, the ball 53 is located in the wide portion of the recess 51, the ball 54 being displaced due to friction with the edge 50 to the narrow portion of recess 52. This may be seen from Fig. 5, which also shows that the reversing member is displaced to the right by the ball 54. Upon reversal of the sense of rotation of the input wheel 3 the ball 53 is taken along to the narrow portion of recess 51, whereas the ball 54 is displaced to the wide portion of recess 52, so that now the reversing member is displaced to the left with respect to the input wheel 3.

The operation of the described clutch mechanism is as follows. Upon rotation of the input wheel 3, for example in the right-hand sense, the intermediate member 14 is taken along by the cam 16 of the input wheel and if the pawl 12 is in the engaged position, the auxiliary member 8 is also taken along. The movement of the auxiliary member is now transferred by way of pin 29 to the intermediate wheel 6, by which the intermediate disc 7 is taken along with the use of the springs 36 and 37. Since the edge of the recess 28 in the intermediate disc 7 engages the pin 26 on the output wheel 4, the latter is also taken along. With the said right-hand rotation of the input wheel 3, the reversing member 5 is axially displaced to the right, as described hereinbefore with reference to Fig. 5. The right-hand toothed rim on the flange 38 of the reversing member then meshes with the corresponding toothed rim of the part 39. The free-wheel constituted by the parts 39 and 41 prevent rotation in the left-hand sense.

Whenever in the foregoing and also hereinafter, reference is made to right-hand or left-hand sense, this is to be understood to mean that the rotation is viewed from the left-hand side in those figures which show a longitudinal section of a clutch mechanism.

When the output part 4 is overloaded for rotation in the right-hand sense, the following action takes place. The output part 4 and also the intermediate disc 7 keep at rest. The auxiliary member 8, which is coupled by the pawl 12 to the intermediate member 14, continues to rotate, however, thus taking along the intermediate disc 6. The recesses of the intermediate discs 6 and 7 are such that such relative displacement of the said discs and hense also of the auxiliary member 8 and of the output part 4 is not prevented. With this displacement the pawl shaft 10, together with the extension of pin 18, moves in the slot 11 of the output wheel 4, pin 18 thus also moving in the V-shaped recess of the plate 19, i. e. from the position shown in Fig. 3a to the left. Since pin 18 was first located in the lower part of the recess, plate 19 with the point of attachment of spring 20 as a pivot is tilted. Spring 20, which first was clear of stop 24, now comes to lie thereon and is stretched, whilst spring 21 disengages from stop 25 due to the rotation of the plate (see Fig. 3b). Whereas pin 18 in its initial position was forced to the intermediate member 14 due to the tension of spring 21, which engages stop 25, the plate 19 now exerts on pin 18 a pressure which tends to lift the pawl 12. However, the pressure of the teeth 13 upon pin 18 keeps pawl 12 still coupled in. Upon further relative displacement of the auxiliary member 8 and the output part 4 in the same sense, pin 18 is finally forced upwards by the inner edge of the slot 11, since this inner edge has a depression which is directed towards the shaft and which initially accommodated the pin 18. As soon as the pawl has disengaged from the teeth of the intermediate member 14 due to the forced movement of the pin 18, the pawl is completely lifted due to the stretched spring 20 now turning back the plate 19 (see Fig. 3c).

Due to the disengagement of pawl 12, the input part 3 is completely detached from the other members of the clutch mechanism serving for the transfer of motive power.

Immediately after pawl 12 has been lifted, the auxiliary member 8 with respect to the stationary output part 4 is still subject only to the turning moment of the springs 36 and 37 which is active in the sense opposite to the initial right-hand movement. A return of the auxiliary member by the action of the moment of the said springs is prevented, however, since the reversing member, with respect to which the auxiliary member can slide but cannot rotate, is coupled to the right-hand frame plate 1 of the mechanism by way of the claw coupling, constituted by the toothed rims on the parts 38 and 39, the free-wheel coupling between the parts 39 and 41, and the part 41 itself. However, the turning moment which acts upon the auxiliary member 8 results in the part 41 performing a small stroke in the left-hand sense until it is stopped by the edge of an aperture 43 provided in the frame plate 1. Switch 46 is actuated by arm 44 due to this displacement of part 41 from its central position as shown in Fig. 6. The switch 46 enables the overload and the disengagement of the clutch mechanism upon rotation of the input wheel 3 in the right-hand sense to be signalled by electrical means. If desired, switch 46 enables the driving mechanism, from which the movement of the input part 3 is inferred, to be stopped or its direction of movement to be reversed.

When the sense of rotation of the input wheel 3 is reversed after the clutch mechanism in the above-described manner is disengaged by rotation in the clockwise direction, the clutch mechanism is engaged again and this is effected in the following manner. Due to the reversal of the direction of movement of the input wheel 3, the reversing member 5 is displaced to the left in the manner previously described, with the result that the claw coupling between the flange 38 and the part 39 is interrupted.

The auxiliary member 8 is now no longer prevented by the action of the springs 35 and 36 from turning in the left-hand sense with respect to the output part 4, which is still at rest. Due to this return movement of the auxiliary member, the pin 18 in the slot 11 of the output wheel is moved back and forced first by the plate 19 and finally by the outer edge of the slot 11 to the teeth of the intermediate member 14. By the time the auxiliary member and the output wheel have again occupied their initial positions, the pawl 12 has again been brought into contact with the intermediate member 14, thus re-establishing the coupling between the input and output parts.

The output part 4 is now taken along in the new sense of rotation until it is overloaded for this sense of rotation, or the sense of rotation of the input part 3 is again reversed. In the former case, pawl 12 is again lifted by relative rotation of the auxiliary member 8 and the output part 4. This is due to the fact that pin 18 now moves in the slot 11 to the right and, similarly as with the previously described overload in the right-hand sense of rotation, is radially forced to the exterior by an inclined edge of the slot 11. After the pawl 12 has been lifted from the intermediate member 14, the relative displacement of the auxiliary member and the output wheel is now also maintained so long as the overload is not eliminated or the sense of rotation of the input wheel is not again reversed. The moment of the springs 35 and 36 is taken up in that the reversing member carrying the auxiliary member is displaced to the left upon the reversal of the direction of movement of the input wheel 3, so that the toothed rim on the left-hand side of the flange 38 is meshed with the toothed rim on the part 40. This part is coupled to part 41 by way of a free-wheel coupling preventing rotation of part 40 with respect to part 41 in the right-hand sense. Part 41 is slightly taken along in the right-hand sense, so that the switch 45 is operated by the arm 44 of part 41 when the pawl 12 is disengaged.

When the overload on the output part is removed after the clutch mechanism has been disengaged, the coupling between the input wheel and the output wheel will be re-established, since the output wheel 4 will continue to move in the sense of rotation previously followed by the action of the turning moment of the springs 35 and 36, whereby the relative displacement of the auxiliary member and the output wheel decreases and these parts reassume the relative position they occupied prior to overload. As previously described in the case of reversal of the direction of movement of the input wheel, the fact that the auxiliary member and the output wheel reassume their initial relative position results in the pawl 12 again being coupled to the intermediate member 14. The object of the lost-motion between the input wheel 3 and the intermediate member 14, which is provided by the cam 16 and the recess 17, is as follows. When the pawl 12 is in engagement and upon rotation of the input wheel 3 in the right-hand or left-hand sense, the auxiliary member is coupled by way of the reversing member 5 and either of the parts 39 and 40 to the part 41 by way of a free-wheel coupling which prevents rotation opposite to the direction of movement followed. Reversal of the direction of movement of the input part cannot produce any effect so long as the auxiliary member remains connected to the free-wheel coupling previously engaged. The lost-motion between the parts 3 and 14 permits the direction of movement of the input wheel to be reversed without the auxiliary member being driven immediately in the new sense. Immediately upon the reversal of the movement of the input wheel 3, the reversing member is displaced in the axial direction, thus interrupting the connection between the reversing member and the free-wheel coupling which prevents movement of the auxiliary member in the new direction of movement. Due to the lost-motion between the input part 3 and the intermediate member 14, the auxiliary member is driven in the new direction only thereafter, this being now possible.

Of the clutch mechanism shown in Fig. 7, the various parts are carried by a shaft 60, which is provided between frame plates 61 and 62. The input part is constituted by a gear wheel 63 which is rotatable about the shaft 60 and on which an intermediate member 64 comprising square teeth is provided. A pawl 65 co-operates with the intermediate member and is secured to a pawl shaft 66, which is rotatably supported in an auxiliary member 67. Similarly as in the clutch mechanism shown in Fig. 1, the pawl shaft extends through a slot 68 of particular shape provided in an output wheel 69. The output wheel and the auxiliary member are both freely rotatable about the reversing member 70, which is mounted on the shaft 60. Rotation of the reversing member 70 with respect to shaft 60 is prevented by means of a key 71, but displacement in the axial direction is possible.

The auxiliary member 67 and the output part 69 are coupled together by way of intermediate discs interconnected by means of springs in such manner as to be relatively rotatable against a spring force, the pawl 65 of which a pin extends into the slot 68 of the output part being controlled by this rotation. This part of the clutch mechanism is entirely identical with that of the clutch mechanism shown in Fig. 1 and is therefore not shown in Fig. 7.

In order that, when the pawl 65 is disengaged due to overload on the output part 69, a reverse movement of the auxiliary member may be prevented, the pawl shaft 66 carries a pawl 72 which, when pawl 65 is lifted, co-operates with the inner gear of a dish-like part 73. This part is rotatably supported by the reversing member 70 and has a toothed rim 74 which meshes with a corresponding toothed rim 75 of the reversing member 70 in the normal operating position.

The left-hand terminal surface of the reversing member 70 constitutes a running surface for a ball 76, which is accommodated in a recess 77 provided in the opposite lateral surface of the input wheel 63. The bottom of the recess 73 constitutes a running surface for the ball 76, which running surface is constituted by two adjoining parts 78 and 79. These parts occupy inclined positions with respect to the terminal surface of the reversing member 70 so that both of them diverge from the terminal surface, viewed from their point of transition (see Fig. 9). The springs 80 and 81 ensure that the ball 76 always makes contact both with the input wheel 63 and the reversing member 70. A spring 82, which always forces the reversing member 70 onto the input wheel 63, is provided between the extremity of the reversing member remote from the input wheel and the frame plates 62. The input wheel 63 is checked in the axial direction by a collar 83 on the shaft 60.

Figures 9 and 10, which show a development of the cylindrical contact surface between the input wheel 63 and the shaft 60, explain the co-operation between the input wheel 63 and the reversing member 70. Upon rotation of the input wheel 63 in the left-hand or right-hand sense, the ball 76 is located in the lower or upper wide portion of the recess 77 and the reversing member 70 is displaced by the spring 82 as far as possible to the left, so that the toothed rims 74 and 75 mesh with one another. When the direction of movement of the input wheel 63 is now inverted, the ball will be displaced from one end of recess 77 to the other. On passing the apex in the bottom of recess 77, which apex is formed by the junction of the two running surfaces 78 and 79, the reversing member is moved by the ball against the pressure of spring 82 to the right (see Fig. 10). When the ball has passed the apex, the reversing member is moved by spring 82 back into its initial position.

The operation of the mechanism shown in Fig. 7 is the following. In normal operation, the input part 63 drives by way of intermediate member 64 and pawl 65 the auxiliary member 67, the movement of which is transferred by way of intermediate discs (not shown) to the output part 69. Pawl 72 is clear of the inner gear of the part 73 when pawl 65 is engaged. The output part 69, on being overloaded, remains at rest and the auxiliary member is displaced with respect thereto, so that similarly as with the clutch mechanism shown in Fig. 1, the pawl co-operating with the intermediate member is lifted, thereby at the same time pawl 72 being coupled to the inner gear of the part 73. Since this latter part is coupled by way of the claw coupling formed by toothed rims 74 and 75 to the reversing member 70, which cannot rotate, a reverse movement of the auxiliary member by which its displacement with respect to the overloaded output part 69 could decrease, is prevented. When the overload on the output part is removed, the output part will displace itself in the sense of rotation previously followed due to the springs provided in the connection with the auxiliary member, so that similarly to the manner in which this takes place in the clutch mechanism in Fig. 1, the pawl 65 is engaged again. Upon this engagement, the pawl 72 is also disengaged from the part 73 so that the initial position is restored. Due to the manner in which the auxiliary member is connected to the output part and in which the pawls 65 and 72 are controlled upon relative displacement of the said parts, the clutch mechanism is disengaged independently of the sense of rotation followed, when the output part is overloaded.

Upon reversal of the direction of movement of the input part, the reversing member 70, as previously explained, is moved to the right by the ball 76, whereby the coupling between the part 73 and the reversing member 70 is interrupted, to be subsequently re-established by the return movement of the reversing member. When the reversal of the direction of movement of the input part takes place when the clutch mechanism is disengaged, the part 73, due to its being released, will be displaced, together with the auxiliary member, with respect to the output part by the action of the springs provided in the connection between the auxiliary member and the output part, so that the pawl 65 is engaged and pawl 72 is lifted. Consequently, the clutch mechanism is re-engaged and its output part taken along in the new sense of rotation, unless the output part is overloaded also for this new sense of rotation. In this case the clutch mechanism is again disengaged.

Upon reversal of the sense of rotation, and after the part 73 has been released by the displacement of the reversing member, so that the pawl 65 has assumed its operative position, the reversing member returns to its initial position so that upon disengagement following overload in the new sense of rotation the auxiliary member is again prevented from returning by way of pawl 72.

When the sense of rotation of the input part is reversed without the clutch mechanism being previously disengaged, there is no objection to the auxiliary member being taken along immediately in the new sense of rotation, since the auxiliary member is coupled by way of pawl 72 to a fixed part of the mechanism, that is to say the shaft 60, only if pawl 65 is clear of the intermediate member 64. This form of clutch mechanism thus requires no lost-motion between the input part 63 and the intermediate member 64. The intermediate member 64 may thus be rigidly connected to the input wheel 63.

Of the clutch mechanism shown in Fig. 11, the various parts are provided between frame plates 100 and 101. The plate 101 carries one shaft-extremity 102, which carries from the left to the right an input wheel 103, an auxiliary member 104, a separate element 105, a part 106, and an output wheel 107. All these parts are freely rotatable.

Connected to the input wheel 103 is an intermediate member 108, comprising square teeth, with which a pawl 109 co-operates, which pawl is secured to a pawl shaft 110, which is rotatably supported by the auxiliary member and which furthermore carries a pawl 111. The latter is adapted to co-operate with the inner gear of a ring 112 which is secured to the frame of the clutch mechanism in a manner which is not shown. The pawl 111 co-operates with the ring 112 only when the pawl 109 is lifted and then prevents the auxiliary member from returning.

The auxiliary member is coupled to the part 105 by means of rotatable intermediate discs interconnected by springs. This is not shown since it is quite similar to the manner in which the auxiliary member is connected to the output wheel in the clutch mechanisms described hereinbefore.

The separate element 105 carries two axially directed pins 113 and 114, which extend into apertures 115 and 116 of the part 106. The latter is provided, on its side, with a toothed rim 118 which, together with a corresponding toothed rim of the output wheel 107, constitutes a claw coupling. This claw coupling is adapted to be disengaged by displacement of part 106 to the left, which displacement is counteracted by a spring 119.

The shaft extremity 102, which for the greater part is made hollow, contains a reversing member 120, the left-hand extremity of which is provided with a flange 121, which extends beside the input wheel 103 and which constitutes a running surface for a ball 122, which is accommodated in a recess 123, provided in the lateral face of the input wheel adjacent the flange 121. The reversing member and the input wheel co-operate by way of the ball 122 similarly as the two corresponding members in the clutch mechanism described with reference to Fig. 7. Thus, the ball 122 slightly displaces the reversing member 120 to the left upon reversal of the direction of movement of the input part. At its other extremity, the reversing member comprises a transverse portion 126 protruding through axial slots 124 and 125 traversely from the shaft-extremity 102, said transverse portion engaging the right-hand side of the part 106. If, now, the reversing member is slightly moved to the left, the part 106 is taken along and the claw-coupling between the part 106 and the output wheel 107 is interrupted. This claw coupling is restored immediately thereafter due to the return movement of the reversing member by the action of spring 119.

The left-hand end of the reversing member is provided with an axial bore 127 into which a shaft-extremity 128, fixed in the frame plate 100, extends for supporting the assembly.

When the clutch mechanism is in its operative state, the motive power is transferred by way of the pawl 109, the auxiliary member 104 and the resilient coupling thereof with the element 105 to the latter and thence by way of the part 106 to the output wheel 107. If, now, the output part is overloaded, this part and hence also the element 105 will remain at rest, whereas the auxiliary member 104 is rotated further. Due to the relative displacement of the auxiliary member and the element 105, the pawl 109 is lifted and pawl 111 is coupled to the internal gear of the ring 112. The rotary pawl shaft 110 and the pawls 109 and 111 are controlled in that the element 104 is provided with a slot into which a cam 129 on the shaft 110 extends. The slot in the element 105 is of a shape similar to that of the slot in the output wheel of the clutch mechanisms shown in Figs. 1 and 7 and is therefore not shown.

Upon reversal of the direction of movement of the input wheel 103, the reversing member 120 is slightly moved to the left, thus taking along the part 106. The element 105 is released by the interruption of the coupling between the part 106 and the overloaded output part 107. If the clutch mechanism is disengaged, the element 105 will displace itself with respect to the auxiliary member by the action of the springs provided in the connection between the element 105 and the auxiliary member, with the result that the pawl shaft 110 is rotated so that the pawl 109 again engages the intermediate member 108 and the pawl 111 is lifted. The motive power is thus transferred again from the input wheel to the part 106 and since in the meantime the coupling between the part 106 and the output part has been re-established, the output part is taken along in the new sense of rotation, unless it is also overloaded for this sense of rotation.

With the clutch mechanisms shown in Figs. 7 and 11, the reciprocating stroke of the reversing member may alternatively be obtained in that of the two elements, input wheel and reversing member, one is provided with a profiled surface which extends in the direction of movement and with which a rotary pawl secured to the other element continuously co-operates. The pawl which is rotatable in the direction of movement of the input part is at an angle with the profiled surface so that upon reversal of the direction of movement of the input part, the pawl is taken along and hence the two elements are spaced apart to approach one another again thereafter.

In the clutch mechanisms shown in Figs. 1 and 7, the connection between the input and output parts is interrupted upon overload by mutual displacement of the auxiliary member and the output part. In the clutch mechanism shown in Fig. 11, the connection is interrupted upon overload by relative displacements of the auxiliary member and a separate element 105, which is coupled to the output part by way of a coupling adapted to be interrupted by displacement of the reversing member.

The auxiliary member is thus similar to the part A mentioned in the preamble, the output part and the separate element being similar to the part B mentioned in the preamble.

In the clutch mechanisms described, movement of the reversing member has the effect of interrupting a claw coupling. It is evident that other couplings may be used with as much effect such, for example, as magnetic couplings of which the energizing circuit is interrupted and/or switched in by means of a switch co-operating with the reversing member.

What we claim is:

1. An automatic overload clutch mechanism comprising a shaft, a sleeve-like, movable reversing member surrounding said shaft, an input part, an output part, first and second relatively displaceable parts, all of said parts being mounted for movement on said reversing member, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second displaceable parts, and said reversing member being motivated by said input part which is displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism.

2. A clutch mechanism as claimed in claim 1 wherein said first and second relatively displaceable parts, upon overload of the output part of said mechanism and reversal of direction of movement of said input part, are displaced from their initial relative positions in opposite directions with respect to one another, said directional force being directed to said initial relative position, said operative connection between the input and output part of said mechanism being interrupted by the displacement of said first and second relatively displaceable parts in one or the other direction, and said operative connection adapted to be re-established when the said first and second relatively displaceable parts reassume their initial relative positions.

3. An automatic overload clutch mechanism comprising a shaft, a sleeve-like, movable reversing member surrounding said shaft, an input part, an output part, first and second relatively displaceable parts, all of said parts being mounted for movement on said reversing member, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second displaceable parts, said reversing member on said clutch mechanism being displaced upon reversal of the direction of movement of said input part, said displacement of said reversing member by the directional force applied thereto operating to restore the relative movability of said first and second displaceable parts so that said displaceable parts assume the relative positions that they occupied prior to the overload of said output part of said clutch mechanism and consequently restoring the operative connection between the input and output parts of said clutch mechanism, said first displaceable part being an auxiliary member adapted to transfer the motive power of said input part to said output part, said second displaceable part being operatively connected to the output part of said clutch mechanism, a fixed part on said clutch mechanism, said means being the means by which the auxiliary member is coupled to said fixed part during overload of said output part, and said reversing member being adapted to coact with said means whereby the connection between said auxiliary member and said fixed part is interrupted by the axial displacement of said reversing member when the direction of movement of said input part is reversed.

4. An automatic overload clutch mechanism comprising a shaft, a sleeve-like movable reversing member surrounding said shaft, an input part, an output part, first and second relatively displaceable parts, said input part, output part and second relatively displaceable part being rotatable on said reversing member, means mounting said first displaceable part for sliding movement on said reversing member, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second displaceable parts, said reversing member on said clutch mechanism being displaced upon reversal of the direction of movement of said input part, said displacement of said member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, said first relatively displaceable part being an auxiliary member adapted to transfer the motive power of said input part to said output part, said auxiliary member being connected by way of a disengageable connection to said input part, an element of said connection adapted to transfer said motive power from said auxiliary member to said output part and being provided with coupling means which are removably engageable with said output part whereby upon reversal of the motive power of said input part said reversing member is displaced causing said coupling means to be disengaged from said output part.

5. An automatic overload clutch mechanism comprising a shaft, a sleeve-like, movable reversing member surrounding said shaft, an input part, an output part, first and second relatively displaceable parts, said input part, output part and second relatively displaceable part being rotatable on said reversing member, means mounting said first displaceable part for sliding movement on said reversing member, said first displaceable part being displaced with respect to said second displaceable part upon overload of the output part of the mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second displaceable parts, said reversing member on said clutch mechanism being displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch, a lost-motion connection between said input part and said output and first displaceable parts whereby upon reversal of the direction of movement of the motive power of said input part said reversing member is displaced before said reverse direction of movement is applied to said first displaceable part and said output part.

6. An automatic overload clutch mechanism comprising a shaft, a sleeve-like movable reversing member surrounding said shaft, an input part, an output part, first and second relatively displaceable parts, said input part, output part and second relatively displaceable part being rotatable on said reversing member, means mounting said first displaceable part for sliding movement on said reversing member, said first displaceable part being displaced with respect to said second displaceable part upon overload of the output part of the clutch mechanism against a directional force provided by the motive power of the input part, said displacement interrupting the operative connection between said input part and said first displaceable part and output part, coupling means which are removably engageable with said output part, means on said clutch mechanism which during overload of the output part of said clutch mechanism prevents a decrease of the relative displacement of said first and second parts, said reversing member being motivated by said input part which is displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, a lost-motion connection between said input part and said output and first displaceable parts, said connection between said input part and said first displaceable part and output part including an element transferring the motive power and constituting a link between said coupling means being controlled by the relative displacement of said first and second relatively displaceable parts and said lost-motion connection between said input part and said output and first displaceable parts.

7. An automatic overload clutch mechanism comprising a shaft, a sleeve-like, movable reversing member surrounding said shaft, an input part, an output part, a separate element, first and second relatively displaceable parts, said input part, output part, first and second relatively displaceable parts and separate element being rotatable on said reversing member, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second parts, said reversing member on said clutch mechanism being displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said mechanism and consequently restoring the operative connection between the input and output parts of said clutch mechanism, a fixed part on said clutch mechanism, said first displaceable part being an auxiliary member adapted to transfer the motive power of said input part to said output part, a disengageable coupling for connecting said auxiliary member to said fixed part by means of said separate element, said coupling adapted to be disengaged by displacement of said reversing member, another coupling which becomes inoperative when said connection between said auxiliary member and said input part is interrupted by relative displacement of said auxiliary member and said output part following an overload of said output part.

8. A clutch mechanism as claimed in claim 7 in which said reversing member coacts with said disengageable coupling provided in said connection between said separate element and said fixed part.

9. An automatic overload clutch mechanism comprising a shaft, a sleeve-like, movable reversing member surrounding said shaft, an input part, an output part, first and second relatively displaceable parts, said input part, output part and second relatively displaceable part being rotatable on said reversing member, means mounting said first displaceable part for sliding movement on said reversing member, said first displaceable part being displaced with respect to said second displaceable part upon overload of the output part of the mechanism against a directional force provided by the motive power of the input part, said displacement interrupting the operative connection between said input part and said first displaceable part and output part, means on said mechanism which during overload of the output part of said clutch mechanism prevents a decrease of the relative displacement of said first and second displaceable parts, said reversing member on said clutch mechanism being displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, said first displaceable part being an auxiliary member adapted to transfer the motive power of said input part to said output part, said second displaceable part being a pair of discs operatively connected to the output part of said clutch mechanism, a fixed part on said mechanism, said means being the means by which the auxiliary member is coupled to said fixed part during overload of said output part, said reversing member being adapted to coact with said means whereby the connection between said auxiliary member and said fixed part is interrupted by the displacement of said reversing member when the direction of movement of said input part is reversed, a lost motion connection between said input part and said output and first displaceable parts whereby upon reversal of the direction of movement of the motive power of said input part said reversing member is displaced before said reverse direction of movement is applied to said first displaceable part and said output part, and said reversing member forming part of the means through which said auxiliary member is adapted to be connected to the fixed part of said mechanism.

10. An automatic overload clutch mechanism comprising a shaft, a sleeve-like, movable reversing member surrounding said shaft, an input part, an output part, first and second relatively displaceable parts, all of said parts being mounted for movement on said shaft, said first displaceable part being displaced with respect to said second displaceable part upon overload of the output part of the mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second displaceable parts, said reversing member on said clutch mechanism being displaced upon reversal of the direction of movement of said input part, said displacement of said clutch member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism and said reversing member adapted to be displaced in a direction transverse to the direction of movement of said input part upon reversal of direction of movement of said input part.

11. An automatic overload clutch mechanism comprising a shaft, a sleeve-like, movable reversing member surrounding said shaft, an input part, an output part, first and second relatively displaceable parts, all of said parts being mounted for movement on said shaft, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second displaceable parts, said reversing member on said clutch mechanism being displaced upon reversal of the direction of movement of said input part, said displacement of said clutch member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, said first and second relatively displaceable parts, upon overload of the output part of said clutch mechanism and reversal of direction of movement of said input part are displaced from their initial relative positions in opposite directions with respect to one another, said directional force being directed to said initial relative position and the operative connection between the input and output part of said clutch mechanism being interrupted by the displacement of said first and second part in one or the other direction, said operative connection adapted to be re-established when the said first and second parts reassume their initial relative positions, and spring means coacting with said reversing member upon reversal of direction of movement of said input part and displacement of said reversing member against said spring means to return said reversing member to its initial position.

12. An automatic overload clutch mechanism comprising a shaft, a sleeve-like, movable reversing member surrounding said shaft, an input part, an output part, first and second relatively displaceable parts, all of said parts being mounted for movement on said shaft, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second displaceable parts, said reversing member on said clutch mechanism being displaced upon reversal of the direction of movement of said input part, said displacement of said member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, at least one roller body between said input part and said reversing member, said reversing member and said input part being provided with running surfaces for said roller body, one of said surfaces being adapted to extend in the direction of movement of said input part and the other of said surfaces being adapted to extend in angular direction with respect to the direction of movement of said input part, means by which said roller body is kept in constant contact with said two running surfaces whereby the roller body, upon reversal of the direction of movement of said input part, displaces said reversing member transversely to the direction of movement of said input part.

13. An automatic overload clutch mechanism comprising a shaft, a sleeve-like, movable reversing member surrounding said shaft, an input part, an output part, first and second relatively displaceable parts, all of said parts being mounted for movement on said shaft, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said mechanism prevents a decrease of the relative displacement of said first and second displaceable parts, said reversing member on said clutch mechanism being displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, said input part being provided with two adjoining running surfaces, said reversing member being provided with a running surface extending in the direction of movement of said input part, a roller body coacting with the running surface of said reversing member and the running surfaces of said input part, the running surfaces of said input part diverging from the running surface of said reversing member as viewed from their transition whereby, upon reversal of the direction of movement of said input part, said roller body is conducted from one inclined running surface to the adjoining inclined running surface causing said reversing member to be displaced transversely to the direction of movement of said input part.

14. An automatic overload clutch mechanism comprising a shaft, a sleeve-like, movable reversing member surrounding said shaft, an input part, an output part, first and second relatively displaceable parts, all of said parts being mounted for movement on said shaft, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second displaceable parts, said reversing member on said clutch mechanism being displaced upon reversal of the direction of movement of said input part, said displacement of said member by the directional force applied thereto operating to restore the relative movability of said first and second displaceable parts so that said parts assume the relative positions that they occupied prior to the overload of said output part of said clutch mechanism and consequently restoring the operative connection between the input and output parts in said clutch mechanism, and said reversing member being adapted to be displaced in the axial direction of said clutch mechanism.

15. An automatic overload clutch mechanism comprising a shaft, a sleeve-like, movable reversing member surrounding said shaft, an input part, an output part, first and second relatively displaceable parts, said input part, output part and second relatively displaceable part being rotatable on said reversing member, means mounting said first displaceable part for sliding movement on said reversing member, said first displaceable part being displaced with respect to said second displaceable part upon overload of the output part of the clutch mechanism against a directional force provided by the motive power of the input part, said displacement interrupting the operative connection between said input part and said first displaceable part and output part, a fixed part on said clutch mechanism, said first displaceable part being an auxiliary member adapted to transfer the motive power of said input part to said output part, means on said clutch mechanism which during overload of the output part of said clutch mechanism prevents a decrease of the relative displacement of said first and second displaceable parts, said reversing member on said clutch mechanism being displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, and said reversing member being provided with one half of a claw-coupling which forms part of the connection between said auxiliary member and said fixed part and which is interrupted by displacement of said reversing member.

16. An automatic overload clutch mechanism comprising a shaft, a sleeve-like, movable reversing member surrounding said shaft, an input part, an output part, first and second relatively displaceable parts, said input part, output part and second relatively displaceable part being rotatable on said reversing member, means mounting said first displaceable part for sliding movement on said reversing member, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second parts, a fixed part on said clutch mechanism, said first displaceable part being an auxiliary member adapted to transfer the motive power of said input part to said output part, said reversing member on said clutch mechanism being displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, a disengageable coupling for connecting said auxiliary member to said fixed part, said coupling being adapted to be disengaged by displacement of said reversing member, another coupling which becomes inoperative when said connection between said auxiliary member and said input part is interrupted by relative displacement of said auxiliary member and said output part following an overload of said output part, two separate members on said reversing member each being operatively and alternately connected to said fixed part by a free-wheel coupling operating automatically in on direction, and said reversing member being slidably supported by said auxiliary member and adapted to be displaced upon reversal of the direction of movement of said input part.

17. An automatic overload clutch mechanism comprising a shaft, a sleeve-like, movable reversing member surrounding said shaft, an input part, an output part, first and second relatively displaceable parts, said input part, output part and second relatively displaceable part being rotatable on said reversing member, means mounting said first displaceable part for sliding movement on said reversing member, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second parts, said reversing member on said clutch mechanism being displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, said first displaceable part being an auxiliary member adapted to transfer the motive power of said input part to said output part, a fixed part on said clutch mechanism, a first disengageable coupling for connecting said auxiliary member to said fixed part, a second coupling which becomes inoperative when said connection between said auxiliary member and said input part is interrupted by relative displacement of said auxiliary member and said output part following an overload of said output part, said first coupling comprising a claw coupling in which one half of said coupling is provided by said reversing member which, upon reversal of the direction of movement of said input part, is displaced causing said coupling to be interrupted, said coupling being made again when said reversing member has returned to its initial position.

18. An automatic overload clutch mechanism comprising a shaft, a sleeve-like, movable reversing member surrounding said shaft, an input part, an output part, first and second relatively displaceable parts, all of said parts being mounted for movement on said shaft, said first displaceable part being displaced with respect to said second displaceable part upon overload of the output part of the clutch mechanism against a directional force provided by the motive power of the input part, said displacement interrupting the operative connection between said input part and said first displaceable part and output part, a fixed part on said clutch mechanism, said first displaceable part being an auxiliary member adapted to transfer the motive power of said input part to said output part, means on said clutch mechanism which during overload of the output part of said clutch mechanism prevents a decrease of the relative displacement of said first and second displaceable parts, said reversing member being motivated by said input part thereby being displaced upon reversal of the direction of movement of said input part, said displacement of said reversing member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, an operating member on said clutch mechanism being adapted for limited movement in relation to said fixed part in the direction of movement of said auxiliary member.

19. A clutch mechanism as claimed in claim 18 in which at least one electric contact is provided thereon, said operating member being adapted to coact with said contact upon activation of said operating member.

20. An automatic overload clutch mechanism comprising a shaft, a sleeve-like, movable reversing member surrounding said shaft, an input part, an output part, first and second relatively displaceable parts, all of said parts being mounted for movement on said shaft, said first displaceable part being displaced with respect to said second displaceable part upon overload of the output part of the clutch mechanism against a directional force provided by the motive power of the input part, said displacement interrupting the operative connection between said input part and said first displaceable part and output part, means on said clutch mechanism which during overload of the output part of said clutch mechanism prevents a decrease of the relative displacement of said first and second displaceable parts, said reversing member on said clutch mechanism being displaced upon reversal of the direction of movement of said input part, said displacement of said member by the directional force applied thereto operating to restore the relative movability of said first and second displaceable parts so that said parts assume the relative positions that they occupied prior to the overload of said output part of said clutch mechanism and consequently restoring the operative connection between the input and output parts of said clutch mechanism, said reversing member being provided with two running surfaces extending in the direction of movement of said input part, said input part being provided with other running surfaces positioned angularly in relation to the direction of movement of said input part, at least one roller body coacting with two of said running surfaces at a time, whereby upon reversal of direction of movement of said input part, said roller body cooperates with said one of the running surfaces extending in the direction of said input part to displace said reversing member, and upon renewed reversal of direction of movement of said input part said roller body cooperates with said other of the running surfaces extending in the direction of movement of said input part to return said reversing member to its initial position.

References Cited in the file of this patent

FOREIGN PATENTS 903,072     France _____ Jan. 5, 1945